(12) United States Patent
Jung (10) Patent No.: US 11,453,240 B2
(45) Date of Patent: Sep. 27, 2022

(54) STEERING CONTROL METHOD AND SYSTEM FOR VEHICLE

(71) Applicants: Hyundai Motor Company, Seoul (KR); Kia Motors Corporation, Seoul (KR)

(72) Inventor: Jang Hyun Jung, Suwon-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 530 days.

(21) Appl. No.: 16/568,696

(22) Filed: Sep. 12, 2019

(65) Prior Publication Data

US 2020/0338926 A1 Oct. 29, 2020

(30) Foreign Application Priority Data

Apr. 23, 2019 (KR) .................. 10-2019-0047418

(51) Int. Cl.
*B60B 39/00* (2006.01)
*B62D 6/00* (2006.01)
*B60C 27/06* (2006.01)
*B60W 10/20* (2006.01)
*B60C 23/06* (2006.01)

(52) U.S. Cl.
CPC .......... *B60B 39/006* (2013.01); *B60C 23/061* (2013.01); *B60C 27/06* (2013.01); *B60W 10/20* (2013.01); *B62D 6/002* (2013.01); *B60W 2422/70* (2013.01)

(58) Field of Classification Search
CPC ..... B60B 39/006; B60C 23/061; B60C 27/06; B60C 23/003; B60C 23/066; B60W 10/20; B60W 2422/70; B62D 6/002; B62D 7/159; B62D 6/00; B62D 5/0457; B60Y 2400/84
See application file for complete search history.

(56) References Cited

FOREIGN PATENT DOCUMENTS

| DE | 102007028757 A1 * | 12/2008 | ........... B60C 23/062 |
|---|---|---|---|
| DE | 102008057986 A1 * | 5/2010 | ........... B62D 5/0469 |
| KR | 10-2013-0033578 A | 4/2013 | |

* cited by examiner

Primary Examiner — Rodney A Butler
(74) Attorney, Agent, or Firm — Morgan, Lewis & Bockius LLP (SF)

(57) ABSTRACT

A steering control method and system for a vehicle may determine whether the snow chain has been mounted by comparing the number of times of vibrations of a certain peak or more detected by respective wheel speed sensors with respect to a current vehicle speed with a predetermined value, and selectively controls the operations of an AFS and a RWS according to the position of the wheel on which the snow chain has been mounted, when it is determined that the snow chain has been mounted.

17 Claims, 10 Drawing Sheets

STEERING CONTROL METHOD AND SYSTEM FOR VEHICLE

CROSS REFERENCE TO RELATED APPLICATION

The present application claims priority to Korean Patent Application No. 10-2019-0047418 filed on Apr. 23, 2019, the entire contents of which is incorporated herein for all purposes by this reference.

BACKGROUND OF THE DISCLOSURE

Field of the Disclosure

The present invention relates to a steering control method and system for a vehicle for steering control while avoiding the interference with a snow chain through a cooperative control between an AFS and a RWS when the snow chain is mounted.

Description of Related Art

A Rear Wheel Steering (RWS) system of a 4-wheel steering (4WS) scheme for steering a rear wheel together with a front wheel may have a rotating radius smaller than that of a 2-wheel steering (2WS) scheme, and greatly improve the turning stability.

Therefore, the four-wheel steering may control a rear wheel steering angle in the reverse phase, which is the opposite direction with respect to a front wheel steering angle, at low speed, reducing the rotating radius, and furthermore, may control the rear wheel steering angle in the same phase, which is the same direction as the front wheel steering angle, at a high speed, enhancing the traveling stability.

Meanwhile, an Active Front Steering System (AFS) is a system for actively controlling a steering gear ratio (=a pinion angle/a steering angle) by adding the input of an actuator to the steering input of a driver.

As described above, to actively control the steering gear ratio, the AFS system utilizes an electric motor actuator and a reducer, and receives a vehicle signal through a controller (ECU) to determine a control value of the pinion angle and drive the actuator.

That is, the AFS system may change the steering gear ratio according to the traveling situation of the vehicle, and increase the steering gear ratio as compared with a non-AFS vehicle at low speed to reduce the number of steering turns, enhancing the steering convenience of the driver, while reducing the steering gear ratio as compared with the non-AFS vehicle at a high speed, enhancing the traveling stability.

However, there is a problem in that when a snow chain is mounted on the rear wheel, the interval between the rear wheel and peripheral portions may not be wide, occurring the interference between the snow chain of the rear wheel and the peripheral portions at operation of the RWS, and likewise, there is a problem in that when the snow chain is mounted on the front wheel, the interference between the snow chain of the front wheel and the peripheral portions may be occurred at operation of the AFS.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a steering control method and system for a vehicle for steering control while avoiding the interference with a snow chain through a cooperative control between an AFS and a RWS, when the snow chain is mounted.

A configuration of the present invention for achieving the object may include determining whether a snow chain has been mounted by comparing the number of times of vibrations of a certain peak or more detected by respective wheel speed sensors with respect to a current vehicle speed with a predetermined value, by a controller; and selectively controlling operations of an Active Front Steering (AFS) and a Rear Wheel Steering (RWS) according to the position of the wheel on which the snow chain has been mounted, when it is determined, by the controller, that the snow chain has been mounted.

The determining whether the snow chain has been mounted may be configured to include receiving, by the controller, information related to the vibrations of the wheel detected through the respective wheel speed sensors; determining a vibration frequency of each wheel by counting the number of times of vibrations of the certain peak or more with respect to the current vehicle speed; and determining that the snow chain has been mounted on the corresponding wheel, when a change rate in the vibration frequency according to a change in the current vehicle speed is within a predetermined range.

When the snow chain has been mounted on both rear wheels, the RWS may be controlled not to operate.

When the snow chain is mounted on both rear wheels and not mounted on both front wheels, the RWS may be controlled not to operate, and an operation of the AFS may be controlled to compensate for a front wheel steering angle by a steering angle compensation amount with respect to a rear wheel steering angle required by the RWS.

The front wheel steering angle may be controlled to be compensated by the AFS in the increasing direction thereof, in the traveling situation where the reverse phase steering by the RWS is required, and the front wheel steering angle is controlled to be compensated by the AFS in the decreasing direction thereof, in the traveling situation where the same phase steering by the RWS is required.

When the snow chain has been mounted on both front wheels, the AFS may be controlled not to operate.

When the snow chain is mounted on both front wheels and not mounted on both rear wheels, the AFS may be controlled not to operate, and an operation of the RWS may be controlled to compensate for a rear wheel steering angle by a steering angle compensation amount with respect to a front wheel steering angle required by the AFS.

When the snow chain has been mounted on all the wheels, the RWS and the AFS may be controlled not to operate.

When the snow chain has been mounted on one wheel of both front wheels, and mounted on one wheel of both rear wheels, the RWS and the AFS may be controlled to operate normally.

When the snow chain has been mounted on only one wheel of all the wheels, the RWS and the AFS may be controlled to operate normally.

A steering control system for a vehicle of the present invention may include an input unit of receiving information related to vibrations of a wheel detected by respective wheel speed sensors; a determination unit of determining a vibration frequency of each wheel by counting the number of times of vibrations of a certain peak or more with respect to a current vehicle speed; a determination unit of determining that a snow chain has been mounted on the corresponding wheel when it is within a predetermined range by comparing a change rate in the vibration frequency according to a change in the current vehicle speed with the predetermined range; and an output unit of outputting an operation signal to an Active Front Steering (AFS) and a Rear Wheel Steering (RWS) to selectively control the operations of the AFS and the RWS according to the position of the wheel on which the snow chain has been mounted.

The present invention through the above configuration may control whether to operate the RWS and the AFS by determining the position of the wheel on which the snow chain has been mounted, preventing the interference between the vehicle body and the peripheral portions due to the operations of the RWS and the AFS in a state where the snow chain has been mounted, and preventing the sense of traveling difference.

Furthermore, it is possible to control to compensate for the front wheel steering angle by use of the AFS when the RWS is controlled not to operate according to the determining whether the snow chain has been mounted to steer the vehicle as if the RWS is operated, and furthermore, to control to compensate for the rear wheel steering angle by use of the RWS when the AFS is controlled not to operate to steer the vehicle as if the AFS is operated, keeping the steering stability and the traveling stability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings.

A vehicle according to an exemplary embodiment of the present invention is mounted with an Active Front Steering (AFS) 1 and a Rear Wheel Steering (RWS) 3, and a vehicle speed and steering angle data are input to a controller CLR to control the steering angles of a front wheel and a rear wheel based on the input data, and particularly, the controller CLR may control the operations of the AFS 1 and the RWS 3 according to whether a snow chain 13 has been mounted.

Figure 1:
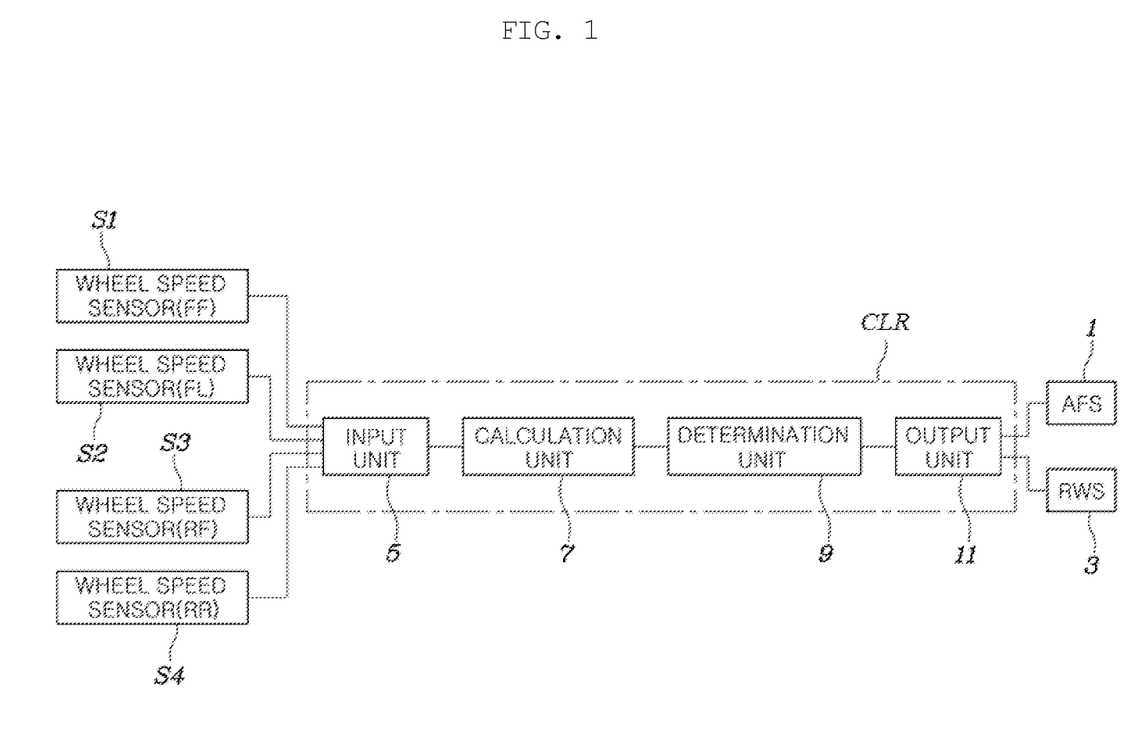
FIG. 1 is a block diagram of a system for steering control for a vehicle according to an exemplary embodiment of the present invention.
Figure 2:
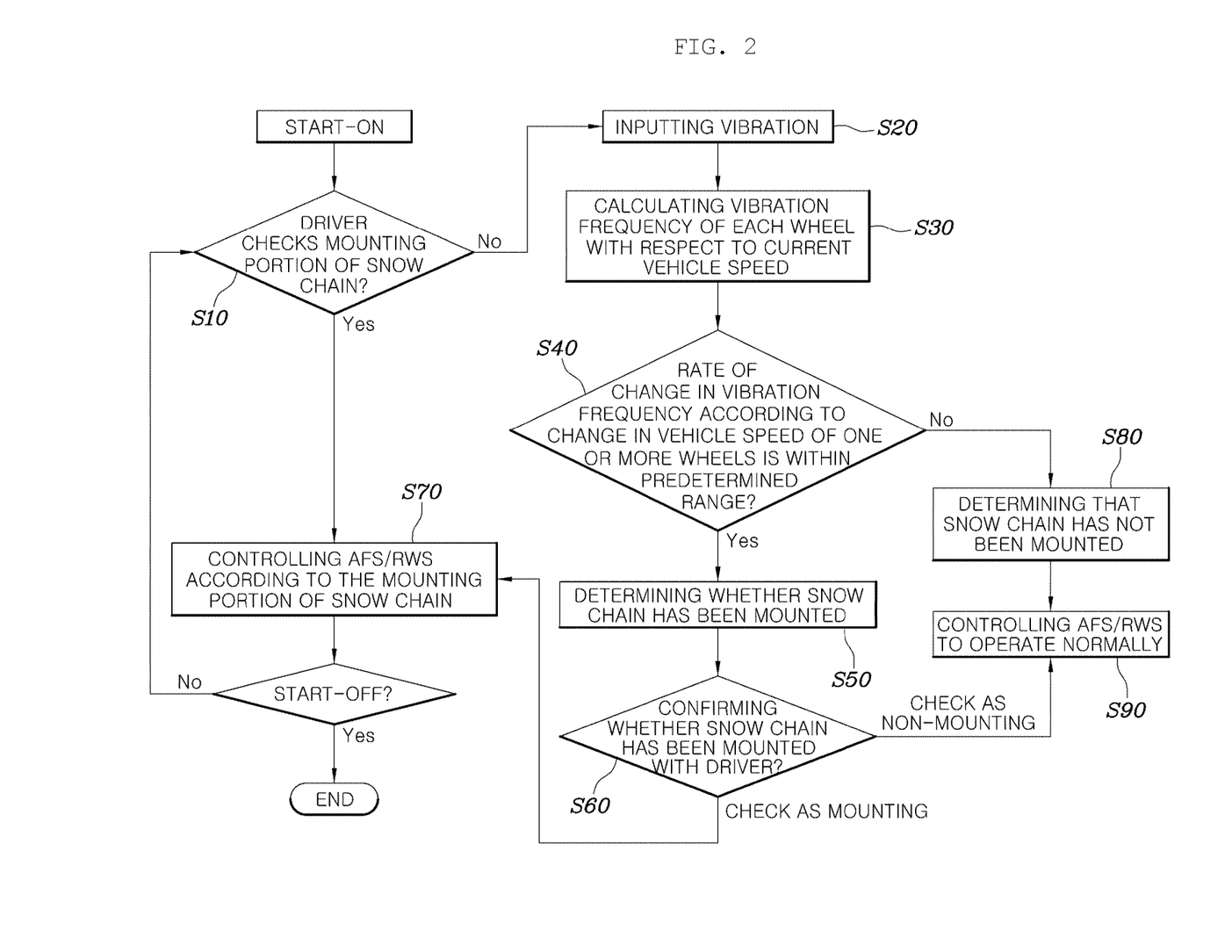
FIG. 2 is a flowchart illustrating a steering control flow according to an exemplary embodiment of the present invention.

Therefore, as illustrated in FIG. 1 and FIG. 2, a steering control method according to an exemplary embodiment of the present invention is configured to include determining whether the snow chain 13 has been mounted by comparing the number of times of vibrations of a certain peak or more detected by respective wheel speed sensors S1, S2, S3, S4 with respect to a current vehicle speed with a predetermined value by the controller CLR, and selectively controlling the operations of the Active Front Steering (AFS) 1 and the Rear Wheel Steering (RWS) 3 according to the position of the wheel on which the snow chain 13 has been mounted when it is determined that the snow chain 13 has been mounted, by the controller CLR.

For reference, the controller according to an exemplary embodiment of the present invention may be implemented through a non-volatile memory configured to store data relating to an algorithm configured to control the operations of various components of the vehicle or software instructions reproducing the algorithm, and a processor configured to perform the operation, which will be described below, by use of the data stored in the corresponding memory. Herein, the memory and the processor may be implemented as a separate chip. Alternatively, the memory and the processor may be implemented as a single chip integrated with each other. The processor may take the form of one or more processors.

More specifically describing a configuration of the determining whether the snow chain 13 has been mounted, when the vibration of the wheel detected through the respective wheel speed sensors S1, S2, S3, S4 is input to the controller CLR, the vibration frequency of each wheel is determined by counting the number of times of vibrations of the certain peak or more with respect to the current vehicle speed.

As such, when a change rate in the vibration frequency according to a change in the current vehicle speed is within a predetermined range, it is determined that the snow chain 13 has been mounted on the corresponding wheel.

That is, when the snow chain 13 is mounted on the wheel, a friction protrusion 15 protrudes along the circumferential direction thereof, such that the regular vibration impact of the certain peak or more is input to the wheel speed sensors S1, S2, S3, S4 by the friction protrusion 15 during the traveling of the vehicle.

As such, the number of times of vibrations due to occurrence of the impact is counted to determine the vibration frequency generated by the friction protrusion 15 for a certain time.

Of course, the vibration frequency thus determined changes according to the vehicle speed, but the change in the vehicle speed and the change in the vibration frequency become the same in the changing rate.

Therefore, when the change rate of the vehicle speed and the change rate of the vibration frequency are the same or kept within a predetermined range, it may be determined that the snow chain 13 has been mounted on the corresponding wheel.

Figure 3:
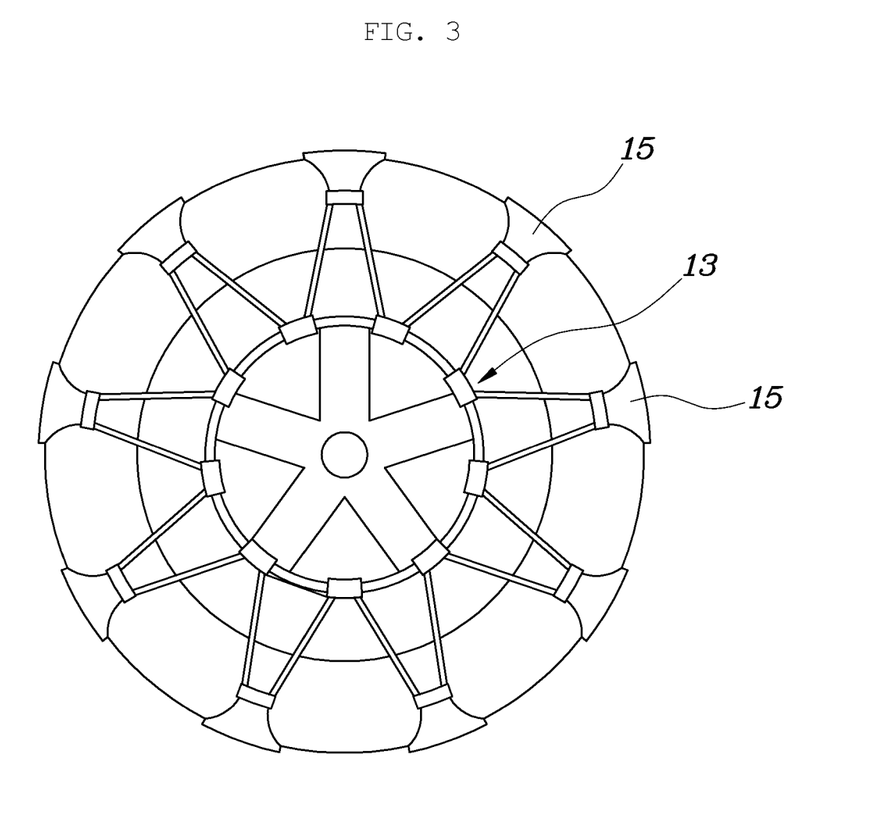
FIG. 3 is a diagram exemplifying a configuration in which a snow chain has been mounted according to an exemplary embodiment of the present invention.

For example, as illustrated in FIG. 3, in the case that the tire has a radius of 10 inches (=0.254 m) and the snow chain 13 having ten friction protrusions 15 has been mounted on the tire, when the vehicle speed is 10 kph, the vibration frequency may be determined as 17 Hz as in the following equation.

10 kph=2.78 m/s

Wheel angular velocity ($\omega$)=10.9 rad/s=1.7 rev/s
Impact input by friction protrusion: 17 times/s
∴Vibration frequency=17 Hz However, when the vehicle speed is changed to 100 kph under the condition that the same snow chain 13 as described above has been mounted, the vibration frequency may be determined as 170 Hz as in the following equation.

100 kph=27.8 m/s

Figure 4:
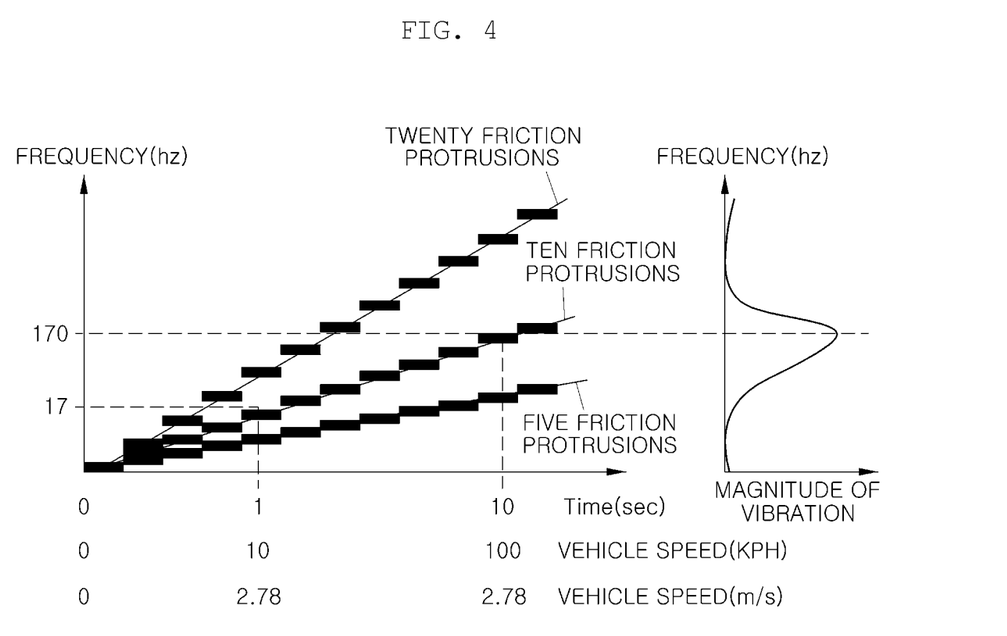
FIG. 4 is a diagram for explaining a state in a change in a vibration frequency with respect to a change in a vehicle speed, when the snow chain is mounted in an exemplary embodiment of the present invention.

Wheel angular velocity ($\omega$)=109 rad/s=17 rev/s
Impact input by friction protrusion: 170 times/s
∴ Vibration frequency=170 hz That is, as illustrated in FIG. 4, when the vehicle speed is increased by 10 times, the vibration frequency is also increased by 10 times equally, and in the instant case, it may be determined that the snow chain 13 has been mounted.

For reference, when the number of the friction protrusions 15 of the snow chain 13 is changed by an increase or a decrease, as in FIG. 4, only the slope of the vibration frequency is changed, and the vibration frequency is changed at the same rate in proportion to the change of the vehicle speed, such that the snow chain 13 regularly provided with the friction protrusion 15 may be used to determine whether the snow chain 13 has been mounted in the above-described manner regardless of the number of the friction protrusions 15.

Therefore, as an example of controlling the AFS 1 and the RWS 3 according to the mounting state of the snow chain 13, the present invention controls the RWS 3 not to operate when the snow chain 13 has been mounted on both rear wheels.

That is, when the snow chain 13 has been mounted on the rear wheel, the RWS 3 is not operated, preventing the snow chain 13 from interfering with peripheral parts.

Figure 5:
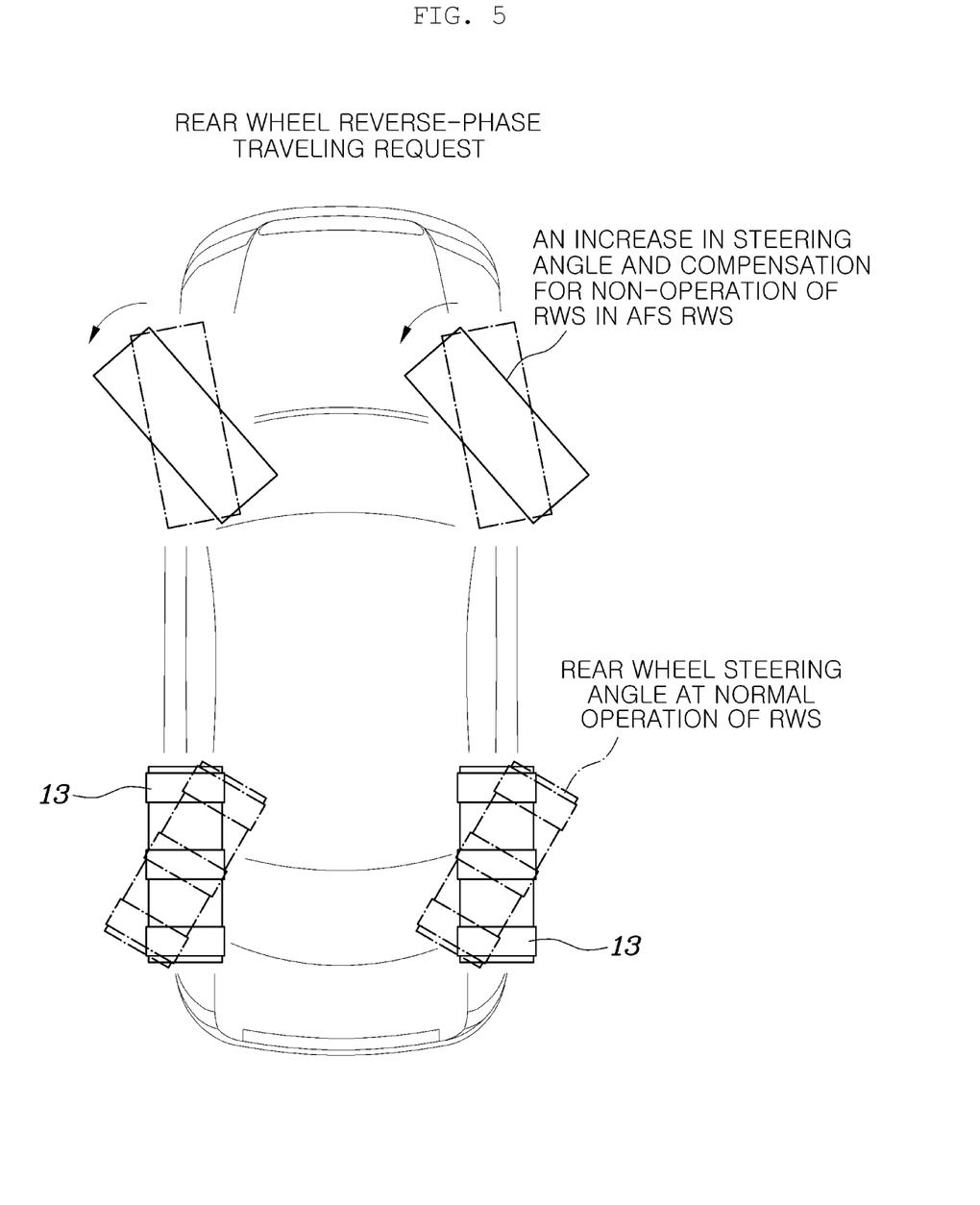
FIG. 5 is a diagram for explaining a control strategy of an AFS and a RWS upon the rear wheel reverse-phase traveling request in a state where the snow chain has been mounted at both rear wheels according to an exemplary embodiment of the present invention.
Figure 6:
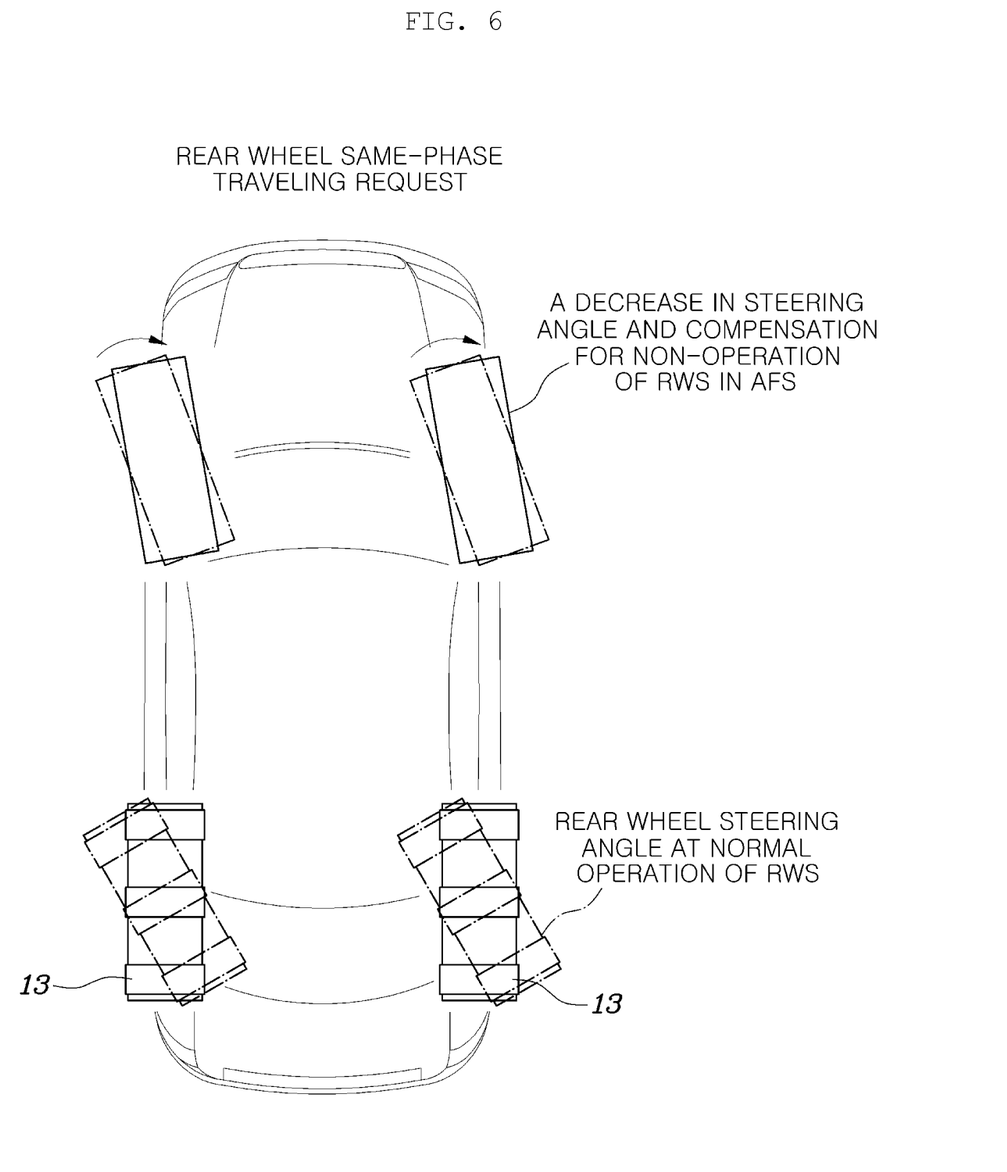
FIG. 6 is a diagram for explaining a control strategy of the AFS and the RWS upon the rear wheel same-phase traveling request in a state where the snow chain has been mounted at both rear wheels according to an exemplary embodiment of the present invention.

As in FIG. 5 and FIG. 6, when the snow chain 13 is mounted on both rear wheels and not mounted on both front wheels, the RWS 3 is controlled not to operate, and the operation of the AFS 1 may be controlled to compensate for the front wheel steering angle by the steering angle compensation amount for the rear wheel steering angle required by the RWS 3.

That is, when the snow chain 13 has been mounted on the rear wheel, the RWS 3 is not operated, such that the steering behavior of the vehicle is disadvantageous in terms of the rotating radius and the turning stability as compared with when the RWS 3 is operated. Therefore, in the instant case, the front wheel steering angle is controlled to be compensated by use of the AFS 1 so that the vehicle may behave as if the RWS 3 is operated.

As an exemplary example, as in FIG. 5, the AFS 1 is controlled to compensate for the front wheel steering angle in the increasing direction thereof, in the traveling situation where the rear wheel should be steered in the reverse phase to the front wheel by the RWS 3.

That is, when the steering wheel is steered in the low-speed traveling situation, the front wheel steering angle is further increased greatly in the steering direction by the AFS 1, implementing the reduction in the rotating radius as if the RWS 3 is operated.

As such, as in FIG. 6, the AFS 1 is controlled to compensate for the front wheel steering angle in the decreasing direction thereof, in the traveling situation where the rear wheel should be steered in the same phase as the front wheel by the RWS 3.

That is, when the steering wheel is steered in the high-speed traveling situation, the front wheel steering angle is controlled to be reduced in the opposite direction of the steering by the AFS 1, implementing the enhancement in the traveling stability as if the RWS 3 is operated.

Furthermore, in an exemplary embodiment of the present invention, when the snow chain 13 has been mounted on both front wheels, the AFS 1 may be controlled not to operate.

That is, when the snow chain 13 has been mounted on the front wheel, the AFS 1 is not operated, preventing the snow chain 13 from interfering with the peripheral parts.

Figure 7:
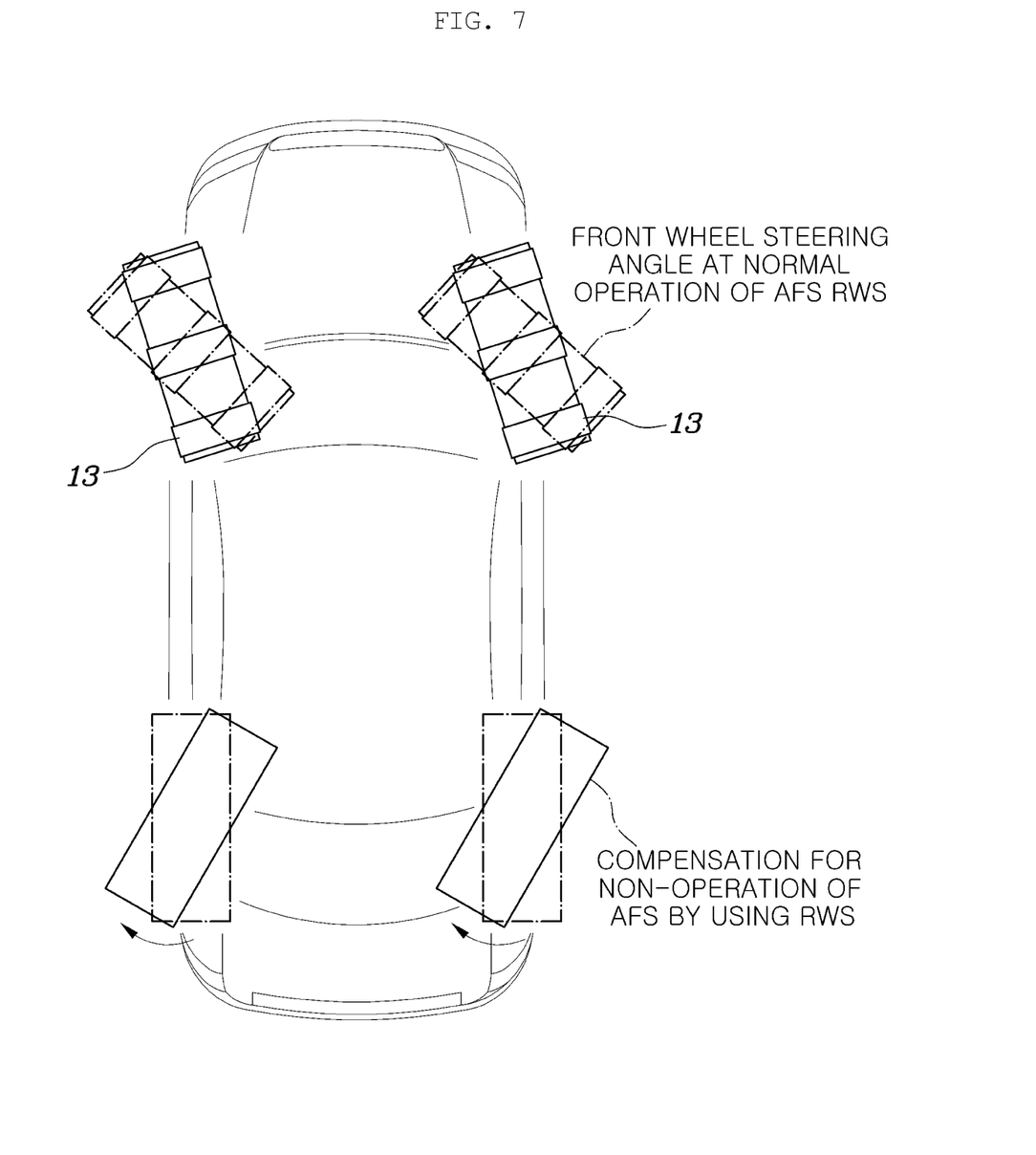
FIG. 7 is a diagram for explaining a control strategy of the AFS and the RWS in a state where the snow chain has been mounted at both front wheels according to an exemplary embodiment of the present invention.

As in FIG. 7, when the snow chain 13 is mounted on both front wheels and not mounted on both rear wheels, the AFS 1 is controlled not to operate, and the operation of the RWS 3 is controlled to compensate for the rear wheel steering angle by the steering angle compensation amount with respect to the front wheel steering angle required by the AFS 1.

That is, when the snow chain 13 has been mounted on the front wheel, the AFS 1 is not operated, such that the steering behavior of the vehicle has the steering gear ratio unchanged as compared with when the AFS 1 is operated, being disadvantageous in terms of the steering convenience and the traveling stability of the driver. Therefore, in the instant case, the rear wheel steering angle is controlled to be compensated by use of the RWS 3 so that the vehicle may behave as if the AFS 1 is operated.

As such, as an exemplary embodiment of the present invention, when the snow chain 13 has been mounted on all the wheels, the RWS 3 and the AFS 1 are controlled not to operate.

That is, when the snow chain 13 has been mounted on both the front wheel and the rear wheel, the RWS 3 and the AFS 1 are not operated, preventing the snow chain 13 from interfering with the peripheral portions of the front wheel and the peripheral portions of the rear wheel.

Furthermore, in an exemplary embodiment of the present invention, when the snow chain 13 has been mounted on some wheels, the AFS 1 and the RWS 3 may be controlled to operate normally, even if it is determined that the snow chain 13 has been mounted.

That is, when the snow chain 13 has been mounted on one wheel of both front wheels and mounted on one wheel of both rear wheels, the RWS 3 and the AFS 1 may be controlled to operate as if the snow chain 13 has not been mounted.

Figure 8:
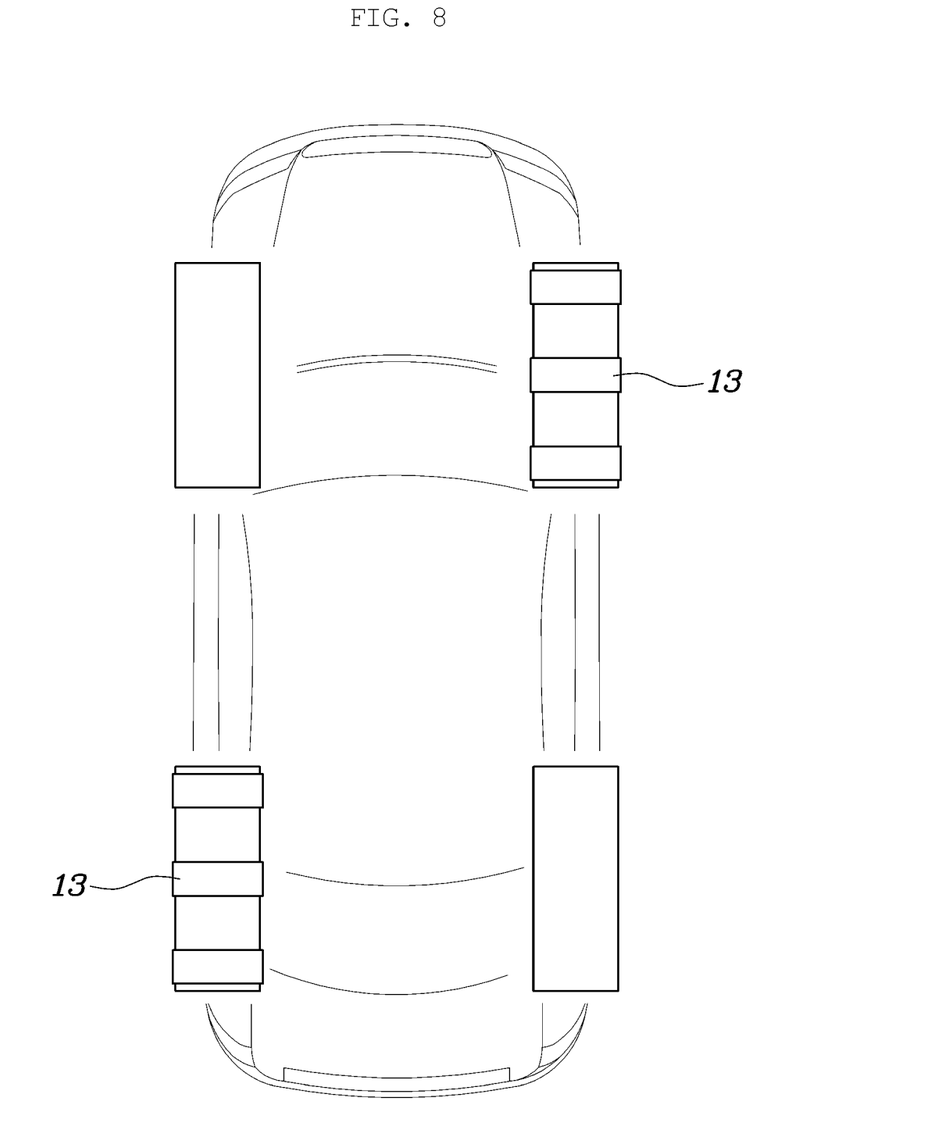
FIG. 8, FIG. 9, and FIG. 10 are diagrams exemplifying a state of controlling to operate normally the AFS and the RWS in a state where the snow chain has been mounted according to an exemplary embodiment of the present invention.

For example, as in FIG. 8, when it is determined that one snow chain 13 has been mounted on the front wheel and the rear wheel in the diagonal direction, respectively, the AFS 1 and the RWS 3 may be controlled to operate normally.

Figure 9:
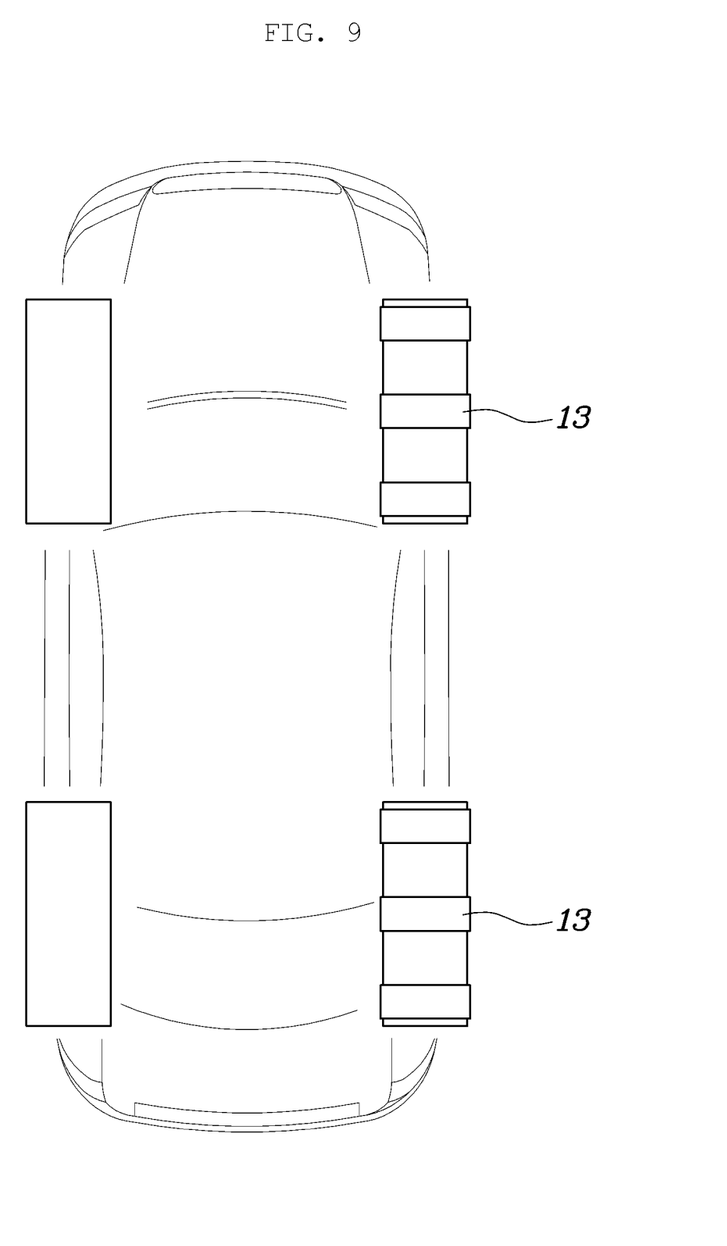

As an exemplary embodiment of the present invention, as in FIG. 9, when it is determined that one snow chain 13 has been mounted only in the direction of any one side of the front wheel and the rear wheel, respectively, the AFS 1 and the RWS 3 may be controlled to operate normally.

Figure 10:
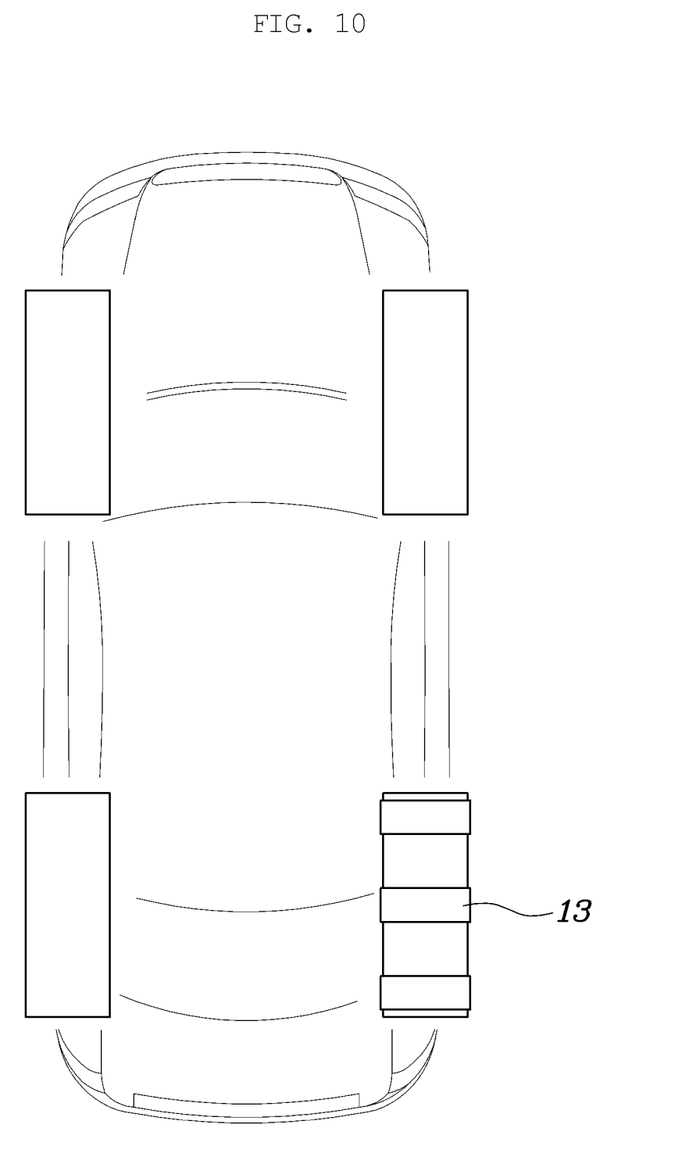

Furthermore, as yet another example, as in FIG. 10, when it is determined that the snow chain 13 has been mounted on only one wheel of all the wheels, the RWS 3 and the AFS 1 may be controlled to operate normally.

Meanwhile, as illustrated in FIG. 1, a system for steering control of the present invention is configured to include an input unit 5, a determination unit 7, a determination unit 9, and an output unit 11.

Firstly, the vibration of the wheel detected through the respective wheel speed sensors S1, S2, S3, S4 is input to the input unit 5.

As such, the determination unit 7 determines the vibration frequency of each wheel by counting the number of times of vibrations of the certain peak or more with respect to the current vehicle speed.

The determination unit 9 determines that the snow chain 13 has been mounted on the corresponding wheel when it is within the predetermined range by comparing the change rate of the vibration frequency according to the change of the current vehicle speed with the predetermined range.

As such, the output unit 11 outputs an operation signal to the AFS 1 and the RWS 3 to selectively control the operations of the Active Front Steering (AFS) 1 and the Rear Wheel Steering (RWS) 3 according to the position of the wheel on which the snow chain 13 has been mounted.

Therefore, describing a steering control flow according to an exemplary embodiment of the present invention as an example with reference to FIG. 2, the vibration detected through the respective wheel speed sensors S1, S2, S3, S4 is input to the controller CLR while the vehicle travels at a certain vehicle speed or greater S20.

As described above, the vibration frequency of each wheel is determined by analyzing vibration information to count the number of times of vibrations of the certain peak or more with respect to the current vehicle speed in the procedure of inputting the vibration information S30.

It is determined that the change rate in the vibration frequency is kept within the predetermined range according to the change in the current vehicle speed in the determination procedure S40, and as the determination result, when the number of the wheels which is kept within the predetermined range is one or more, it is determined that the snow chain 13 has been mounted on the corresponding wheel S50.

As such, the position of the wheel on which the snow chain 13 has been mounted is determined, and the operations of the RWS 3 and the AFS 1 are controlled according to the determined position of the wheel S70.

However, when it is determined that the snow chain 13 has been mounted in the S50, a confirmation window that asks whether the snow chain 13 has been mounted may be displayed on a cluster without immediately proceeding to the S70 S60.

In the instant case, when the driver checks that the snow chain 13 has been mounted, it may proceed to the S70 to control the operations of the RWS 3 and the AFS 1 by the above-described control strategy according to the mounting position of the snow chain 13.

However, when the driver checks that the snow chain 13 has not been mounted in the S60, the RWS 3 and the AFS 1 may be controlled to operate normally S90.

Of course, as the determination result of the S40, when there is no wheel which is kept within the predetermined range, it may be determined that the snow chain 13 has not been mounted S80, and in the instant case, the RWS 3 and the AFS 1 may be controlled to operate normally S90.

For example, describing a control method of the RWS 3 and the AFS 1 in the S70, when the snow chain 13 has been mounted only on both front wheels, the operation of the AFS 1 is controlled to compensate for the front wheel steering angle by the degree corresponding to the rear wheel steering angle required by the RWS 3 while controlling the RWS 3 not to operate.

As such, when the snow chain 13 has been mounted only on both rear wheels, the operation of the RWS 3 is controlled to compensate for the rear wheel steering angle by the degree corresponding to the front wheel steering angle required by the AFS 1 while controlling the AFS 1 not to operate.

Furthermore, when the snow chain 13 has been mounted on all the wheels, both the RWS 3 and the AFS 1 are controlled not to operate.

On the other hand, when one snow chain 13 has been mounted on the front wheel and the rear wheel, respectively, or the snow chain 13 has been mounted on only one wheel of the four wheels, the RWS 3 and the AFS 1 are controlled to operate normally even if it is detected that the snow chain 13 has been mounted.

Furthermore, the vehicle may be prepared with a switch, etc. configured for directly selecting whether the snow chain 13 has been mounted by the driver, such that the driver may directly check the mounting portion of the snow chain 13 before entering the S20 at the beginning of the start-up S10.

Therefore, when the driver directly checks the mounting portion of the snow chain 13, it may proceed to the S70 to control the operations of the RWS 3 and the AFS 1 at the mounting position of the snow chain 13 according to the above-described control strategy. The control strategy may control by resetting upon start-ON after start-OFF to determine whether the snow chain 13 has been mounted at each start-up.

As described above, the present invention determines the position of the wheel on which the snow chain 13 has been mounted to control whether to operate the RWS 3 and the AFS 1, preventing the interference with the vehicle body and the peripheral portions due to the operations of the RWS 3 and the AFS 1 in the state where the snow chain 13 has been mounted, and preventing the sense of traveling difference.

Furthermore, it is possible to control to compensate for the front wheel steering angle by use of the AFS 1 when the RWS 3 is controlled not to operate according to the determining whether the snow chain 13 has been mounted to steer the vehicle as if the RWS 3 is operated, and furthermore, to control to compensate for the rear wheel steering angle by use of the RWS 3 when the AFS 1 is controlled not to operate to steer the vehicle as if the AFS 1 is operated, keeping the steering stability and the traveling stability of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A steering control method for a vehicle including a plurality of wheels, the steering control method comprising:
    determining, by a controller, when a snow chain has been mounted by comparing a number of times of vibrations of a predetermined peak or more detected by respective wheel speed sensors with respect to a current vehicle speed, with a predetermined value; and
    selectively controlling, by the controller, operations of an Active Front Steering (AFS) and a Rear Wheel Steering (RWS) according to a position of a wheel on which the snow chain has been mounted among the plurality of wheels, when it is determined, by the controller, that the snow chain has been mounted,
    wherein the plurality of wheels includes first and second rear wheels, and
    wherein upon determining that the snow chain has been mounted on the first and second rear wheels, the RWS is controlled not to operate.

2. The steering control method for the vehicle according to claim 1, wherein the determining of when the snow chain has been mounted includes:
    receiving, by the controller, information related to vibrations of the wheels detected through the respective wheel speed sensors;
    determining, by the controller, a vibration frequency of each wheel by counting the number of times of vibrations of the predetermined peak or more with respect to the current vehicle speed, from the information related to the vibrations of the wheels; and
    determining that the snow chain has been mounted on a corresponding wheel, when a change rate in the vibration frequency of each wheel according to a change in the current vehicle speed is within a predetermined range.

3. The steering control method for the vehicle according to claim 1,
    wherein the plurality of wheels further includes first and second front wheels, and
    wherein upon determining that the snow chain is mounted on the first and second rear wheels and not mounted on the first and second front wheels, the RWS is controlled not to operate, and an operation of the AFS is controlled to compensate for a front wheel steering angle by a steering angle compensation amount with respect to a rear wheel steering angle required by the RWS.

4. The steering control method for the vehicle according to claim 3,
    wherein the front wheel steering angle is controlled to be compensated by the AFS in an increasing direction thereof, in a traveling situation of the vehicle where a reverse phase steering by the RWS is required, and
    wherein the front wheel steering angle is controlled to be compensated by the AFS in a decreasing direction thereof, in the traveling situation where a same phase steering by the RWS is required.

5. The steering control method for the vehicle according to claim 1,
    wherein the plurality of wheels further includes first and second front wheels, and
    wherein upon determining that the snow chain has been mounted on the first and second front wheels, the AFS is controlled not to operate.

6. The steering control method for the vehicle according to claim 5,
    wherein upon determining that the snow chain is mounted on the first and second front wheels and not mounted on the first and second rear wheels, the AFS is controlled not to operate, and an operation of the RWS is controlled to compensate for a rear wheel steering angle by a steering angle compensation amount with respect to a front wheel steering angle required by the AFS.

7. The steering control method for the vehicle according to claim 1,
    wherein the plurality of wheels further includes first and second front wheels, and
    wherein upon determining that the snow chain has been mounted on all of the plurality of wheels, the RWS and the AFS are controlled not to operate.

8. The steering control method for the vehicle according to claim 1,
    wherein the plurality of wheels further includes first and second front wheels, and
    wherein upon determining that the snow chain has been mounted on one wheel of the first and second front wheels, and mounted on one wheel of the first and second rear wheels, the RWS and the AFS are controlled to operate normally.

9. The steering control method for the vehicle according to claim 1,
    wherein the plurality of wheels further includes first and second front wheels, and
    wherein upon determining that the snow chain has been mounted on one wheel of all of the plurality of wheels, the RWS and the AFS are controlled to operate normally.

10. A steering control system for a vehicle having a plurality of wheels, the steering control system comprising a controller including:

an input unit of receiving information related to vibrations of the wheels detected by respective wheel speed sensors;

a determination unit of determining a vibration frequency of each wheel by counting a number of times of vibrations of a predetermined peak or more with respect to a current vehicle speed, from the information related to the vibrations;

a determination unit of determining that a snow chain has been mounted on a corresponding wheel when a change rate in the vibration frequency is within a predetermined range by comparing the change rate in the vibration frequency according to a change in the current vehicle speed with the predetermined range; and an output unit of outputting an operation signal to an Active Front Steering (AFS) and a Rear Wheel Steering (RWS) to selectively control operations of the AFS and the RWS according to a position of the corresponding wheel on which the snow chain has been mounted, among the plurality of wheels, wherein the plurality of wheels includes first and second rear wheels, and wherein upon determining that the snow chain has been mounted on the first and second rear wheels, the RWS is controlled not to operate.

11. The steering control system for the vehicle according to claim 10, wherein the plurality of wheels further includes first and second front wheels, and wherein upon determining that the snow chain is mounted on the first and second rear wheels and not mounted on the first and second front wheels, the RWS is controlled not to operate, and an operation of the AFS is controlled to compensate for a front wheel steering angle by a steering angle compensation amount with respect to a rear wheel steering angle required by the RWS.

12. The steering control system for the vehicle according to claim 11, wherein the front wheel steering angle is controlled to be compensated by the AFS in an increasing direction thereof, in a traveling situation of the vehicle where a reverse phase steering by the RWS is required, and wherein the front wheel steering angle is controlled to be compensated by the AFS in a decreasing direction thereof, in the traveling situation where a same phase steering by the RWS is required.

13. The steering control system for the vehicle according to claim 11, wherein the plurality of wheels further includes first and second front wheels, and wherein upon determining that the snow chain has been mounted on the first and second front wheels, the AFS is controlled not to operate.

14. The steering control system for the vehicle according to claim 13, wherein upon determining that the snow chain is mounted on the first and second front wheels and not mounted on the first and second rear wheels, the AFS is controlled not to operate, and an operation of the RWS is controlled to compensate for a rear wheel steering angle by a steering angle compensation amount with respect to a front wheel steering angle required by the AFS.

15. The steering control system for the vehicle according to claim 10, wherein the plurality of wheels further includes first and second front wheels, and wherein upon determining that the snow chain has been mounted on all of the plurality of wheels, the RWS and the AFS are controlled not to operate.

16. The steering control system for the vehicle according to claim 10, wherein the plurality of wheels further includes first and second front wheels, and wherein upon determining that the snow chain has been mounted on one wheel of the first and second front wheels, and mounted on one wheel of the first and second rear wheels, the RWS and the AFS are controlled to operate normally.

17. The steering control system for the vehicle according to claim 10, wherein the plurality of wheels further includes first and second front wheels, and wherein upon determining that the snow chain has been mounted on one wheel of all of the plurality of wheels, the RWS and the AFS are controlled to operate normally.

* * * * *